3,148,225
INHIBITING POPCORN POLYMER FORMATION
Harry E. Albert, Lafayette Hill, Pa., assignor to Pennsalt Chemicals Corporation, Philadelphia, Pa., a corporation of Pennsylvania
No Drawing. Filed Aug. 14, 1962, Ser. No. 216,764
11 Claims. (Cl. 260—669)

This invention relates to the inhibition of the undesirable polymerization of olefinic monomers which give rise to popcorn polymers and is particularly concerned with the use of N,N-dialkylhydroxylamines as popcorn polymer inhibitors in processes relating to the preparation of synthetic rubber.

In the preparation of synthetic rubber from such intermediates as styrene and butadiene (e.g. SBR elastomers) undesirable spontaneous polymerization often occurs in the recovery systems for the olefinically unsaturated monomers. Polymerization may occur to form either a clear, solid, aromatic solvent soluble polymer or to form an entirely different cross-linked insoluble polymer, known, because of its appearance, as popcorn polymer. While both types of this self-polymerization are objectionable, the popcorn polymer, which is predominantly formed, is particularly undesirable because it is self-propagating in the presence of the monomer vapor or liquid and not only rapidly fouls the equipment, but is very difficult to remove and control. When such popcorn polymers do form it frequently becomes necessary to disassemble the equipment and mechanically remove the accumulations of unwanted polymer.

Much work has been done to find suitable inhibitors to prevent popcorn polymer formation. Nitrites and nitroso compounds have been found to be effective as have $NO_2$, $N_2O_3$, certain phenolic compounds, sulfur and some aromatic amines. However, each of these agents leaves something to be desired for commercially effective use. Some of the agents are difficult to handle; others introduce colored impurities into the recovered olefins; some, although having the desired properties, are too expensive to be of commercial utility. One of the major objections to previously used popcorn polymer inhibitors is their ineffectiveness in the presence of seed; that is, where clean equipment is used, the prior art inhibitors will reduce the tendency for popcorn polymer to form, but once a popcorn polymer seed is formed the inhibitors lose effectiveness. As will be seen, this invention provides popcorn polymer inhibitors which retain their inhibiting properties even when popcorn polymer seed is in the system.

Because of the uniqueness of the popcorn polymer and the manner in which it is formed, there is no correlation between popcorn polymer inhibition and monomer stabilizers useful to prevent the premature polymerization of olefins during shipping and storage. Thus, although hydroxylamine hydrochloride has been reported in U.S. 2,318,211 to be useful for stabilizing styrene against premature polymerization, the use of hydroxylamine or its salts as a popcorn polymer inhibitor is fraught with difficulties and cannot effectively be used in commercial processes. For example, hydroxylamine is not stable as its free base and is thus difficult to store and use. Since it decomposes to a large extent in several hours it must continually be added to maintain an effective concentration. Most important, however, because the salt is not volatile and the free base is unstable, neither can be evenly distributed throughout the gaseous recovery system where the popcorn polymer forms. Still another disadvantage with hydroxylamine salts is their insolubility in the monomers and thus they require physical contact which makes for inefficient inhibition properties. It is probably because of these factors that hydroxylamine salts function so poorly as popcorn polymer inhibitors. Likewise, numerous other agents reported to be stabilizers for olefinic monomers are not effective as popcorn polymer inhibitors. For example, vapor phase evaluation for popcorn polymer inhibition of numerous monomer stabilizers indicated that they were either ineffective or only very slightly more effective than a control test in which they were not present. Thus it is clear that the finding of an improved popcorn polymer inhibitor adaptable for use in the recovery systems of elastomer manufacturing processes, especially the finding of one soluble in the hydrocarbon monomers employed, is a significant advance in the art.

It has now been found by means of this invention that effective inhibition of popcorn polymer formation can be achieved by the use of N,N-dialkylhydroxylamines which correspond to the chemical formula

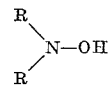

where the R is a lower alkyl group. By lower alkyl group is meant such groups as methyl, ethyl, propyl, isopropyl, butyl, isobutyl and amyl and the R groups may be the same or different.

As already indicated, in the manufacture of synthetic rubber the problem of popcorn polymer formation is peculiar to the monomer recovery system where the monomers are recovered by distillation.

The conventional closed system for the emulsion polymerization of butadiene with styrene comprises a conventional reaction vessel equipped with a stirring mechanism and necessary heating or cooling means in which the monomers are caused to polymerize. After a suitable degree of polymerization is achieved, the polymerization reaction is stopped by the addition of a suitable short stopping agent. The resulting polymer latex is then allowed to flow into a flash tank which is at or slightly above atmospheric pressure and at which time most of the residual butadiene is removed from the latex. The gaseous butadiene is then removed from the flash tank and liquified for reuse. The butadiene degassed latex is then allowed to flow into a conventional vacuum flash tank where further butadiene and other dissolved gaseous materials are removed. The vacuum flash tank is maintained at a temperature of about 100° F. It is in this vacuum flash tank that the most ideal conditions for popcorn polymer formation exist because the tank is at the proper temperature; the atmosphere above the level of latex contained in the tank contains about 2% or less of butadiene; and a certain amount of catalyst has vaporized and collected on the inner exposed metal surfaces of the tank above the level of the latex. These conditions will initiate popcorn polymer. The popcorn polymer will continue to grow as long as it is fed by a new supply of latex containing a small proportion of butadiene and other polymerizable monomer, such as styrene. The pipe lines leading to and from this vacuum flash tank are also ideal areas for popcorn polymer formation.

The latex is then pumped from the vacuum flash tank to a conventional styrene stripping column where the latex is passed counter-current to a rising stream of steam causing the styrene to be removed from the latex where it is then recirculated in a conventional manner to the reaction vessel for polymerization with butadiene. In the styrene stripping column popcorn polymer formation also tends to develop unless some precautions are taken to prevent its development.

Preferably, the inhibitor is added to a flash tank used in the process. However, the inhibitor may be introduced to the monomer at any stage in the manufacture of synthetic rubber, as for example during the manufacture, handling, storage, etc. of the intermediates. For example, the inhibitor vapor can be introduced as the gaseous monomer is being passed through pipes, it can be mixed with the monomer in process tanks, or, as indicated, it can be introduced during the fractional distillation of materials in the recovery systems of the rubber manufacturing process. In the preferred technique it is considered best to feed the monomer into a flash tank or fractional distillation column of conventional type. The monomer is subject to fractional distillation using conventional reboiling at the bottom of the column and withdrawal of overhead material at the top, condensing the overhead material and returning a portion of it to the top of the column as reflux. The inhibiting vapor or solution is continuously fed, preferably by spraying its solution in water or monomer into the upper portion of the column through which it descends. In other techniques the inhibitor can be introduced to one or more of the monomers in any phase wherein the monomer is being circulated in the process.

The concentration at which the inhibitor is used will usually range from 0.001 to about 5.0 percent by weight of the total monomers (i.e. about 10 to 50,000 parts per million parts of monomer). At concentrations below this value the inhibiting effects are too small to be of significant value. On the other hand, greater amounts may be used, say up to 20%, but such large amounts are not required and are simply wasteful of inhibitor.

It is to be understood that the N,N-dialkylhydroxylamine may be used generally to prevent popcorn polymers in the preparation of polymers and copolymers such as those obtained from ethylenically unsaturated monomers. For homopolymers, the unsaturated monomer will be a conjugated diolefin. The useful conjugated diolefins are exemplified by butadienes such as butadiene-1,3, isoprene, cyanobutadiene-1,3, chloroprene, 2-phenylbutadiene, 2,3-dimethylbutadiene-1,3, and the like. The copolymerizable monomer used in copolymer formation and which will normally comprise up to about 70% of the mixture will be a mono-olefin containing a single $CH_2=CH-$ group having at least one of the free valence bonds attached to an electronegative group. Such olefins include aromatic olefins such as styrene, vinylnaphthalene, α-methylstyrene, p-chlorostyrene, etc.; the carboxy containing monomers and the corresponding esters, nitriles, and amides such as acrylic acid, methacrylic acid, methylmethacrylate, acrylonitrile, methacrylamide, and the like. Preferably, this invention will be used in recovering the monomers used to make any butadiene-based polymer latex.

In order to illustrate the effectiveness of the invention, the following exampels are given:

EXAMPLE 1

A one-half gram sample of popcorn polymer seed from a styrenebutadiene rubber (SBR) plant flash tank (formed from styrene containing a small amount of butadiene) was placed in a seven ounce bottle previously flushed with nitrogen and containing 30 ml. of fresh, caustic-washed styrene. The bottle was capped with a self-sealing cap and 1 ml. of liquid butadiene and the inhibitor was added through the cap with a hypodermic syringe. The bottles were kept at elevated temperatures and observed until popping (i.e. polymerization and formation of popcorn polymer) was found. The following table indicates the results obtained:

Table I

| Inhibitor—Percent by Weight of Monomer | Time and Temperature Conditions Required for Popping |
|---|---|
| None | 4 to 6 hrs. at 100° F. |
| Diethylhydroxylamine: | |
| 18.1 | No popping after 7 days at 100° F. plus 20 days at 140° F. |
| 3.6 | Do. |
| 2.9 | Do. |
| 2.2 | Do. |
| 1.5 | Do. |
| 0.72 | Do. |
| 0.36 | Do. |
| 0.090 | 6 days at 100° F.+9 days at 140° F. |
| 0.018 | 6 days at 100° F.+2 hrs. at 140° F. |
| 0.009 | 2 days at 100° F. |

EXAMPLE 2

Example 1 was repeated except that the seeds were suspended about three inches above the liquid monomer. In this way vapor phase inhibition could be studied.

When no inhibitor was present there was no popcorn growth for 7 days at 100° F. but immediate growth was observed on raising the temperature to 140° F., the seed having increased several times in volume.

On the other hand, when 0.2 g. of diethylhydroxylamine was present (0.72% by weight of monomer) no growth of seed was observed after 7 days at 100° F. plus 16 days at 140° F.

EXAMPLE 3

In this experiment, thirteen bottles were loaded. First, each bottle was flushed with nitrogen, then 0.5 g. of popcorn polymer seed from an SBR plant flash tank was added. Twenty-five ml. of freshly distilled styrene was added to all bottles except Nos. 5, 6 and 13, where 30 ml. was used. After being flushed with nitrogen for 10 minutes, each bottle was capped with a self-sealing cap and 1 ml. of butadiene was injected with a hypodermic syringe. In all bottles except Nos. 5, 6 and 13 the desired amount of dialkylhydroxylamine in 5 ml. of styrene was injected through the cap with a hypodermic syringe. For bottles 5 and 6 this inhibitor injection was carried out with 5 ml. of aqueous solution of the desired concentration prepared from a 72% aqueous solution of dimethylhydroxylamine. Bottle 13 was the blank used as a control. Thus all bottles contained 0.5 g. of popcorn polymer seed plus 30 ml. of styrene and 1 ml. of butadiene. The following Table II summarizes the results obtained:

Table II

| Bottle No. | Inhibitor Compound | Percent by Weight of Monomers | Results |
|---|---|---|---|
| 1 | Diethylhydroxylamine. | 0.01 | Popped after 6 days @ 100° F. + 7 hrs. @ 140° F. |
| 2 | do | 0.079 | Popped after 6 days @ 100° F. + 8 days @ 140° F. |
| 3 | do | 0.32 | Popped after 6 days @ 100° F. + 13 days @ 140° F. |
| 4 | do | 0.63 | Popped after 6 days @ 100° F. + 20 days @ 140° F. |
| 5 | Dimethylhydroxylamine. | 0.017 | Popped after 5 days @ 100° F. |
| 6 | do | 0.34 | Popped after 6 days @ 100° F. + 10 days @ 140° F. |
| 7 | Di-isopropylhydroxylamine. | 0.016 | Popped after 6 days @ 100° F. |
| 8 | do | 0.31 | Popped after 6 days @ 100° F. + 15 days @ 140° F. |
| 9 | do | 0.015 | Popped after 6 days @ 100° F. |
| 10 | do | 0.29 | Popped after 6 days @ 100° F. + 8 days @ 140° F. |
| 11 | Di-n-butylhydroxylamine. | 0.017 | Popped after 5 days at 100° F. |
| 12 | do | 0.34 | Popped after 6 days @ 100° F. + 6 days @ 140° F. |
| 13 | No inhibitor | | Popped after 12 hours @ 100° F. |

EXAMPLE 4

Vapor phase evaluations were carried out with numerous compounds which are known to inhibit styrene polymerization. The tests were conducted by adding the compound to be evaluated at two levels (0.03 and 0.1 part per hundred parts of monomers) to 30 ml. of inhibitor free styrene and 1 ml. of liquid butadiene contained in a 7 oz. bottle. In this bottle 0.5 g. of popcorn polymer seed was placed in a stainless steel wire basket suspended over the liquid. The bottles and their contents were heated to 140° F. by placing in an air oven and they were inspected periodically for the formation of popcorn polymer in the wire basket. The data obtained are shown in the following Table III.

*Table III*

COMPARISON OF DIETHYLHYDROXYLAMINE WITH VARIOUS STYRENE STABILIZERS FOR INHIBITION OF POPCORN POLYMER FORMATION IN THE VAPOR PHASE

| Inhibitor | Observations at 0.03 phm. | Observations at 0.1 phm. |
| --- | --- | --- |
| No inhibitor | Popcorn growth began after 2 days, extensive growth after 4 days. | Popcorn growth began after 2 days, extensive growth after 4 days. |
| Pyrogallol | do | Popcorn growth began after 2 days, extensive growth after 7 days. |
| Guaiacol | do | Popcorn growth began after 3 days, extensive growth after 7 days. |
| N-Methylaniline | do | Popcorn growth began after 2 days, extensive growth after 4 days. |
| Phenyl-2-naphthylamine | do | Do. |
| p-Phenylenediamine | do | Do. |
| 4-tert-Butylcatechol | do | Popcorn growth began after 2 days, extensive growth after 7 days. |
| α-Naphthol | do | Do. |
| Hydroquinone | do | Popcorn growth began after 3 days, extensive growth after 7 days. |
| p-Aminophenol | do | Do |
| Di-tert-amylphenol | do | Popcorn growth began after 2 days, extensive growth after 4 days. |
| p-tert-Butylphenol | do | Popcorn growth began after 3 days, extensive growth after 7 days. |
| p-Nitrosodimethylaniline | do | Popcorn growth began after 2 days, extensive growth after 7 days. |
| p-Benzylaminophenol | do | Do |
| Dibenzyl-p-aminophenol | do | Popcorn growth began after 2 days, extensive growth after 4 days. |
| Catechol | do | Popcorn growth began after 3 days, extensive growth after 7 days. |
| Diamylhydroquinone | do | Do |
| Hydroxylamine sulfate | do | Popcorn growth began after 4 days, extensive growth after 7 days. |
| Hydroxylamine hydrochloride | do | Popcorn growth began after 6 days, moderate growth after 10 days. |
| N,N-Diethylhydroxylamine | Popcorn growth began after 4 days, extensive growth after 7 days. | No popcorn growth after 11 days. |

It is clear from the above table that inhibitors of styrene polymerization are generally ineffective as popcorn polymer inhibitors. On the other hand, when N-N-diethylhydroxylamine is present in the system, the inhibition of popcorn polymer formation is two to five times that obtained with any of the other agents.

EXAMPLE 5

In the normal manufacture of SBR, a shortstopped latex is run through a flash tank maintained at a slight pressure (3 to 4 pounds per square inch) where most of the excess butadiene is removed and then to a vacuum flash tank, maintained at about 20 inches of mercury vacuum, where more of the butadiene is removed. In this vacuum flash tank, conditions are ideal for popcorn polymer formation, since a large amount of styrene is present with a small amount of butadiene and there are air leaks into this tank which catalyze popcorn polymer formation. When 0.01 part of diethylhydroxylamine per 100 parts of monomer is sprayed as a 13% by weight aqueous solution into the second tank, it is found that popcorn polymer formation usually experienced is still not in evidence after five weeks of continuous operation.

The above examples and description clearly show the many advantages of the invention. There is still another unexpected advantage however, resulting from use of N,N-diethylhydroxylamines to control popcorn polymer formation. In butadiene flash tanks there is, in addition to formation of popcorn polymer, a buildup of prematurely coagulated latex called floc which leaves a layer of the normal styrene butadiene rubber on the inside of the tank. This floc is very difficult to remove and this removal must be done mechanically by workers who enter the tank with scrapers. Because the layer of floc absorbs styrene and butadiene, the tank is steamed, treated with sodium bisulfite, and blown out before human entry. It has now been found that when N,N-diethylhydroxylamine is used to control popcorn polymer in the butadiene flash tank, and the tank subsequently prepared for human entry, the rubber layer is "popped" from the walls and mechanical removal is greatly aided. The explanation for this effect is probably that as long as the N,N-diethylhydroxylamine vapors are present, no polymerization of styrene and butadiene absorbed in the rubber occurs, but upon steaming and blowing the tank, the inhibitor is removed and the very rapid popcorn polymer formation actually pulls the rubber away from the tank surface. This effect results in a very significant and economical saving in the rubber manufacturing process.

In view of the above description of the invention and the examples illustrating it, it is clear that this invention provides an improved method for controlling popcorn polymer formation in both liquid phase and vapor phase systems. The volatility of the N,N-dialkylhydroxylamines permits their introduction by injection into vapor streams and enables them to permeate throughout the entire system to be protected. The superiority of the N,N-dialkylhydroxylamines as popcorn polymer inhibitors is clearly evident from the examples given above and the invention represents a significant advance in the art.

It will be understood that the above description and examples are merely illustrative and that numerous changes and variations may be made without departing from the spirit and scope of the invention.

I claim:

1. The process of retarding the formation of popcorn polymers in olefin monomer recovery systems, which comprises contacting said monomer with an inhibiting amount of a compound having the structure

where $R_1$ and $R_2$ are alkyl groups containing from one to five carbon atoms in each of said alkyl groups.

2. The process of inhibiting popcorn polymer formation from monomers used in the preparation of butadiene based elastomers which comprises contacting said monomers with an inhibiting amount of an N,N - dialkylhydroxylamine containing from one to five carbon atoms in each of said alkyl groups.

3. The process of inhibiting popcorn polymer formation from monomers used in the preparation of a styrene and a butadiene co-polymer which comprises contacting said monomers with from about 0.001% to about 5% by weight of said monomers of an N,N-dialkylhydroxylamine containing from one to five carbon atoms in each of said alkyl groups.

4. The process of claim 3 wherein the inhibitor is N,N-dimethylhydroxylamine.

5. The process of claim 3 wherein the inhibitor is N,N-diethylhydroxylamine.

6. The process of claim 3 wherein the inhibitor is N,N-diisopropylhydroxylamine.

7. The process of claim 3 wherein the inhibitor is N,N-di-n-butylhydroxylamine.

8. In the process of preparing a synthetic elastomer from ethylenically unsaturated monomers, the improvement of inhibiting popcorn polymer formation in the recovery system for said monomers by contacting said monomers with about 0.001% to about 5% by weight of said monomers of an N,N-dialkylhydroxylamine containing from one to five carbon atoms in each of said alkyl groups.

9. A mixture of ethylenically unsaturated monomers wherein at least one conjugated diolefin is present containing between about 0.001% to about 5% by weight of said monomers of an N,N-dialkylhydroxylamine containing from one to five carbon atoms in each of said alkyl groups whereby said monomers are stabilized against polymerization in the presence of a polymer seed.

10. In the process of recovering ethylenically unsaturated monomers by fractional distillation, the improvement of introducing into said distillation system an amount of an N,N-dialkylhydroxylamine containing from one to five carbon atoms in each of said alkyl groups sufficient to inhibit popcorn polymer formation.

11. The process of claim 10 wherein about 0.001% to about 5% by weight of the monomers of N,N-diethylhydroxylamine is introduced into a distillation system recovering styrene and butadiene.

References Cited in the file of this patent
UNITED STATES PATENTS 2,318,211      Foord _____ May 4, 1943